US012659884B2

(12) United States Patent
Wilhelmsson et al.

(10) Patent No.: US 12,659,884 B2
(45) Date of Patent: Jun. 16, 2026

(54) EFFICIENT RANDOM ACCESS IN A WIRELESS TELECOMMUNICATION SYSTEM

(71) Applicant: Telefonaktiebolaget LM Ericsson (publ), Stockholm (SE)

(72) Inventors: Leif Wilhelmsson, Lund (SE); Jonas Sedin, Brentford (GB); Sebastian Max, Cologne (DE); Charlie Pettersson, Solna (SE); Rocco Di Taranto, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 380 days.

(21) Appl. No.: 18/567,346

(22) PCT Filed: Jun. 24, 2021

(86) PCT No.: PCT/EP2021/067381
§ 371 (c)(1),
(2) Date: Dec. 5, 2023

(87) PCT Pub. No.: WO2022/268326
PCT Pub. Date: Dec. 29, 2022

(65) Prior Publication Data
US 2024/0147387 A1 May 2, 2024

(51) Int. Cl.
*H04W 52/36* (2009.01)
*H04W 52/24* (2009.01)
*H04W 74/0833* (2024.01)

(52) U.S. Cl.
CPC ....... *H04W 52/367* (2013.01); *H04W 52/245* (2013.01); *H04W 74/0841* (2013.01)

(58) Field of Classification Search
CPC ............. H04W 52/245; H04W 52/367; H04W 74/0808; H04W 74/0841
See application file for complete search history.

(56) References Cited

U.S. PATENT DOCUMENTS 6,285,662 B1 * 9/2001 Watanabe ......... H04W 74/0841
370/280
2010/0317383 A1 * 12/2010 Lee .................... H04W 52/242
455/501

(Continued)

FOREIGN PATENT DOCUMENTS

CA 2663162 A1 4/2008

OTHER PUBLICATIONS

PCT International Search Report, mailed Mar. 24, 2022, in connection with International Application No. PCT/EP2021/067381, all pages.

(Continued)

*Primary Examiner* — Benjamin H Elliott, IV
(74) *Attorney, Agent, or Firm* — Murphy, Bilak & Homiller, PLLC

(57) ABSTRACT

A wireless communication device is operated to transmit information on a random access channel of a network node. Operation involves determining a first transmit power level for a transmission of the information, and selecting a first transmission time for the transmission of the information, wherein the selected first transmission time is determined by a number drawn from a first contention window, and wherein the selected first transmission time corresponds to a first amount of time delay that must elapse before transmission of the information occurs. The information is transmitted at the selected first transmission time, at the first transmit power level. When the transmitted information was not successfully received by the network node, a size of a second contention window is determined based on a size of the first contention window and on the first transmit power level. A second transmission time is selected for the transmission of the information, wherein the selected second transmission time is determined by a number drawn from the second contention window and wherein the selected second (Continued)

transmission time corresponds to a second amount of time delay that must elapse before transmission of the information occurs. The information is transmitted at the selected second transmission time, at a second transmit power level.

22 Claims, 14 Drawing Sheets

(56)                    References Cited

U.S. PATENT DOCUMENTS

| | | | | |
|---|---|---|---|---|
| 2012/0071192 A1* | 3/2012 | Li | .................... | H04W 52/367 |
| | | | | 455/522 |
| 2018/0167976 A1* | 6/2018 | Wentink | .......... | H04W 74/0816 |
| 2020/0305202 A1* | 9/2020 | Zhang | ............. | H04W 74/0833 |
| 2020/0374926 A1* | 11/2020 | Shah | .................. | H04B 7/0626 |
| 2021/0345239 A1* | 11/2021 | Houghton | ........ | H04W 52/0206 |
| 2023/0403565 A1* | 12/2023 | Bhuyan | ............... | H04B 17/336 |
| 2023/0421308 A1* | 12/2023 | Ding | .................. | H04L 1/1854 |
| 2024/0147387 A1* | 5/2024 | Wilhelmsson | ...... | H04W 52/367 |
| 2025/0338321 A1* | 10/2025 | Katar | .................. | H04W 28/06 |

OTHER PUBLICATIONS

PCT Written Opinion, mailed Mar. 24, 2022, in connection with International Application No. PCT/EP2021/067381, all pages.

Gore, A.D., et al., "Power Controlled FCFS Splitting Algorithm for Wireless Networks", Military Communications Conference, 2007., MILCOM 2007. IEEE, Oct. 29, 2007 IEEE, Piscataway, NJ, USA, 36 pages.

Behzad, A., et al., "On the Performance of Randomized Power Control Algorithms in Multiple Access Wireless Networks", Wireless Communications and Networking Conference, 2005 IEEE New Orleans, LA, USA, Mar. 13-17, 2005, Piscataway, NJ, USA, IEEE, vol. 2, pp. 707-711.

Choi, Y., et al., "Multichannel Random Access in OFDMA Wireless Networks", IEEE Journal on Selected Areas in Communications, vol. 24, No. 3, Piscataway, NJ, US, Mar. 2006, pp. 603-613.

Boccardi, F., et al., "Why to Decouple the Uplink and Downlink in Cellular Networks and How To Do It", IEEE Communications Magazine, Mar. 2016, pp. 110-117.

* cited by examiner

EFFICIENT RANDOM ACCESS IN A WIRELESS TELECOMMUNICATION SYSTEM

BACKGROUND

The present invention relates to random access in a wireless telecommunication system, and more particularly to efficient random access technology.

An essential part of wireless telecommunication systems relates to how a device initially can connect to one of the systems' network nodes and how a device can effectively obtain resources for transmitting data in the up-link (UL) direction (i.e., from the wireless device to the node). The need for the latter arises when the device has obtained data and wants to send it to the network node as soon as possible.

A principal way of addressing the problems mentioned above is typically by means of a random access (RA) procedure, so named because of the working procedure that is performed to achieve the connection. Fundamentally, the RA attempt can be considered to consist of two parts. In the first part, a radio resource (defined by time and/or frequency) to be used for RA is randomly selected. In the second part, the actual RA message is transmitted in the selected resource. If the RA message is correctly received by the network node, the network responds with a confirmation of this successful reception.

The reason for selecting the resource randomly comes from the fact that two or more devices may want to use RA, and if these two or more devices transmit their RA message using the same resource, the resulting mutual interference will result in a high likelihood that none of the RA messages will be correctly received at the network node. This situation is called a random access "collision". By letting the devices choose the resource randomly, this probability is reduced.

Although RA and corresponding problems are present in several standards, the discussion here exemplifies the problem in connection with IEEE 802.11-compliant technology. For this reason, the network node is herein referred to as an access point (AP) and a device as a station (STA). Despite these adopted points of view, however, aspects of the herein-described technology are not limited only for use in IEEE 802.11-compliant technology. Moreover, aspects of the herein-described technology are applicable regardless of whether the RA transmission is for establishing initial access (e.g., IEEE 802.11 association) or for sending data.

A key performance indicator for the RA is how many attempts are required until the message is received successfully at the AP, and this depends on many things. One of these is how the random selection is implemented, and another is how many STAs are performing random access at the same time. One important aspect when it comes to random access is to ensure than the system is stable, which means that if two STAs engage in RA at the same time, the probability of a collision will decrease with every repeated attempt. The number of attempts required to successfully communicate a message is further affected by the fact that there will be some delay between successive attempts, and further by the fact that the number of contending STAs may change, further potentially increasing the risk for collision.

To address this problem, one uses an approach referred to as exponential back-off. Essentially, a STA in its first RA attempt selects a random number uniformly between 0 and a value called $CW_{min}$, where $CW_{min}$ is the initial size of a contention window. $CW_{min}$ may for instance be 15, but this is not an essential aspect of the technology. The STA then uses the random number as a basis for selecting the RA resource. For example, the STA may adopt a strategy in which it counts the number of idle time slots as they occur and then transmits its message if this number has reached the drawn number. In this sense, the drawn number corresponds to a transmission time for the message, since it is an offset from a start of the contention window. If the transmission fails, it is assumed that this is because there was a collision (i.e., that two or more STAs drew the same number and consequently transmitted at the same time). To reduce the probability of this happening again in the next attempt, a new random number is selected, but now between 0 and $2 \times CW_{min}+1$ in order to decrease the likelihood that another STA will draw the same number. For each required retransmission (up to a limit), the size of the contention window (corresponding to the range of numbers from which a STA's count is drawn) is doubled (i.e., increased exponentially). It is reset to the initial $CW_{min}$ if the transmission succeeds or if the packet is discarded.

It is readily seen that exponential back-off reduces the probability for collision at the expense of a large increase in the access delay. In many cases, the amount of time needed for random access may severely limit the performance and sometimes even prevent service in certain use cases. Specifically, the time it takes to access the channel is unpredictable when exponential back-off is employed and what is even worse, there is a risk that this time will be very large due to the possibility of a very large random number being selected after a few failed channel access attempts. Another problem with this conventional approach is that it is wasteful of channel resources. Specifically, if two devices both send a RA message that fail, the time and radiofrequency resources used for these transmissions have effectively been wasted.

There is therefore a need for technology that addresses the above described and/or related problems.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters may be provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in technology (e.g., methods, apparatuses, nontransitory computer readable storage media, program means) that operates a wireless communication device to transmit information on a random access channel of a network node. Operation involves determining a first transmit power level for a transmission of the information, and selecting a first transmission time for the transmission of the information, wherein the selected first transmission time is determined by a number drawn from a first contention window, and wherein the selected first transmission time corresponds to a first amount of time delay that must elapse before transmission of the information occurs. The information is transmitted at the selected first transmission time, at the first transmit power level. When the transmitted information was not successfully received by the network node, a size of a second contention window is determined based on a size of the first contention window and on the first transmit power level. A second transmission time is selected for the transmission of the information, wherein the selected second transmission time is determined by a number drawn from the second contention window and wherein the selected second transmission time corresponds to a second amount of time delay that must elapse before transmission of the information occurs. The information is transmitted at the selected second transmission time, at a second transmit power level.

In another aspect of embodiments consistent with the invention, the second transmit power level is equal to the first transmit power level.

In yet another aspect of alternative embodiments consistent with the invention, the second transmit power level is greater than the first transmit power level.

In still another aspect of embodiments consistent with the invention, operation comprises receiving power level information from the network node; and using the received power level information to determine the first transmit power level.

In another aspect of embodiments consistent with the invention, using the received power level information to determine the first transmit power level comprises using the received power level information to determine a minimum transmit power level; and selecting the first transmit power level from one or more power levels that are at or above the minimum transmit power level.

In yet another aspect of embodiments consistent with the invention, the one or more power levels that are at or above the minimum transmit power level comprise at least two transmit power levels, and selecting the first transmit power level from the one or more power levels that are at or above the minimum transmit power level comprises randomly selecting one of the at least two transmit power levels.

In still another aspect of embodiments consistent with the invention, the received power level information is a target receive power level, and operation comprises using information about the random access channel to determine the first transmit power level such that it will cause transmitted information to be received at or above the target receive power level at the network node.

In another aspect of embodiments consistent with the invention, determining the first transmit power level for the transmission of the information comprises selecting the first transmit power level from a plurality of fixed power levels.

In yet another aspect of embodiments consistent with the invention, a difference between any two of the plurality of fixed power levels is at least 5 dB.

In still another aspect of embodiments consistent with the invention, selecting the first transmit power level from the plurality of fixed power levels comprises selecting the first transmit power level from only the fixed power levels that satisfy a required link budget for transmission on the random access channel to the network node.

In another aspect of embodiments consistent with the invention, operation comprises determining the required link budget for the transmission on the random access channel to the network node by estimating a pathloss on the random access channel between the wireless communication device and the network node.

In yet another aspect of embodiments consistent with the invention, selecting the first transmit power level from the plurality of fixed power levels comprises using a priority of the transmission of the information as a basis for selecting the first transmit power level, wherein a higher priority causes selection of a higher transmit power level.

In still another aspect of embodiments consistent with the invention, operation comprises assigning a first priority to the transmission if the wireless communication device is not associated with the network node; and assigning a second priority to the transmission if the wireless communication device is associated with the network node, wherein the first priority is higher than the second priority.

In another aspect of embodiments consistent with the invention, selecting the first transmit power level from the plurality of fixed power levels comprises randomly selecting the first transmit power level from the plurality of fixed power levels.

In another aspect of embodiments consistent with the invention, operation comprises randomly selecting the second transmit power level from the plurality of fixed power levels.

In yet another aspect of embodiments consistent with the invention, selecting the first transmission time for the transmission of the information comprises randomly selecting a transmission time falling within the first contention window.

In still another aspect of embodiments consistent with the invention, the size of the second contention window is longer than the size of the first contention window.

In another aspect of embodiments consistent with the invention, the wireless communication device performs all transmissions on the random access channel in compliance with IEEE 802.11 standards.

In yet another aspect of embodiments consistent with the invention, a network node is operated to control transmissions on a random access channel associated with the network node. Operation involves signaling, to one or more wireless communication devices, a minimum receive power level to be achieved by any transmissions by the one or more wireless communication devices on the random access channel; and signaling, to the one or more wireless communication devices, information from which each of the wireless communication devices determines a plurality of power levels from which each of said one or more wireless communication devices selects a transmission power level to be used when transmitting on the random access channel.

In another aspect of embodiments consistent with the invention, the information from which each of the wireless communication devices determines the plurality of power levels is the plurality of power levels.

In yet another aspect of embodiments consistent with the invention, a minimum difference between any two of the plurality of power levels is 5 dB.

In still another aspect of embodiments consistent with the invention, the information from which each of the wireless communication devices determines a plurality of power levels comprises a minimum step size difference between any two of the plurality of power levels.

In another aspect of embodiments consistent with the invention, the minimum step size difference between any two of the plurality of power levels is 5 dB.

BRIEF DESCRIPTION OF THE DRAWINGS

The objects and advantages of the invention will be understood by reading the following detailed description in conjunction with the drawings in which.

DETAILED DESCRIPTION

Figure 1A:
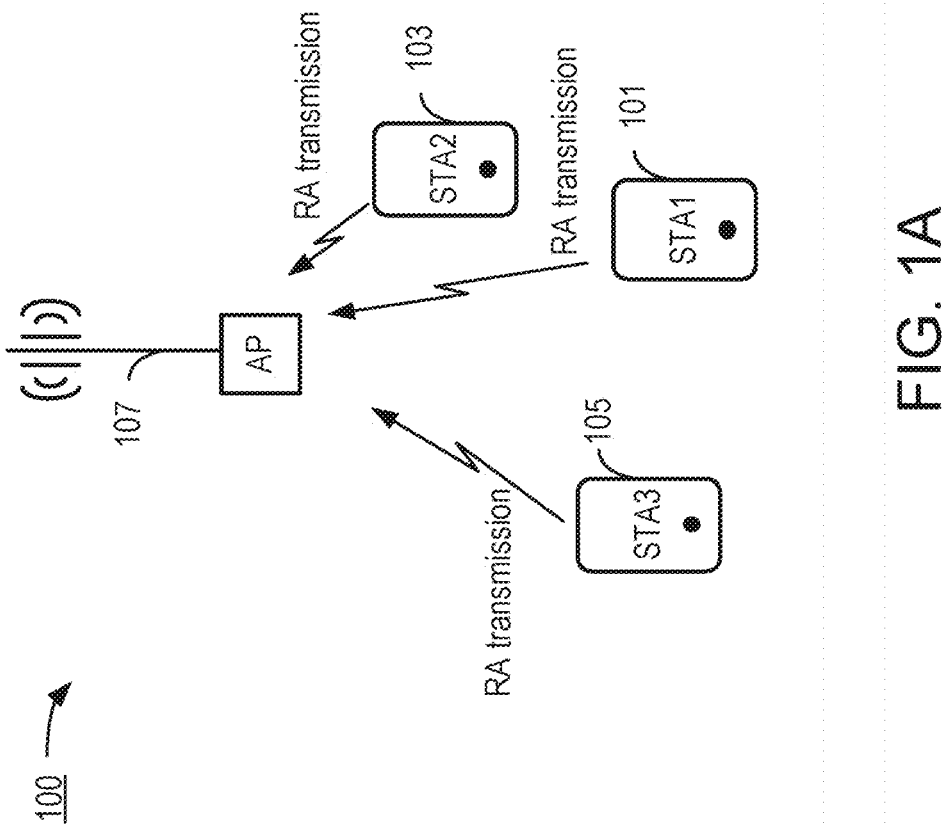
FIG. 1A is a system diagram illustrating an exemplary system comprising a network node (AP) and several wireless communication devices (STAs) within its coverage area.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits alone, one or more programmed processors, or any combination of these). Moreover, the invention can additionally be considered to be embodied entirely within any form of nontransitory computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In an aspect of embodiments consistent with the invention, technology is provided that increases the likelihood that a RA message will be correctly received at the network node.

In another aspect of embodiments consistent with the invention, RA transmissions are performed in a way that, on average, takes less time than RA transmissions performed by conventional technology, and as a side-effect also enhances spectrum efficiency. The various embodiments utilize a strategy that is based on the property that even if there is a collision between two or more RA messages, one of them can be correctly received provided the received power of this message is sufficiently higher than the (total) received power of the other RA messages. This property is herein referred to as a capture.

In yet another aspect of embodiments consistent with the invention, the capture effect is put into use by arranging for different devices to perform RA transmissions using respectively different transmit power levels that increase the probability that one RA message will be received at a significantly higher power level than the others, thereby improving the chance that, if there is a collision between this and one or more other messages, this message will be successfully received.

Since a collision with capture means that one of the RA attempts is successful despite the collision, there is a significantly smaller risk that the following RA attempt will also involve a collision. This is easily appreciated in case of two devices contending, since then, after the first attempt where one RA attempt succeeded, there is only one device that has to do a second attempt thus completely avoiding any risk for collision. For this reason, there is also the possibility to not increase the contention window and by that significantly reduce the probability of large delays.

In another aspect of some but not necessarily all embodiments consistent with the invention, when the total number of devices that potentially can perform RA is very small, the power levels can be selected such that a capture will occur in the case of simultaneous RA attempts. However, when a moderate to large number of devices are considered, ensuring capture is not possible due to there being a limited range over which the respective transmission powers can be selected (e.g., a variation of 30 dB), and in order for capture to happen the difference in received power must exceed some threshold (e.g., 10 dB). To address this problem, and in yet another aspect of some but not necessarily all embodiments consistent with the invention, the power levels may be selected randomly in a way that is somewhat similar to the way in which the respective delays between retransmissions is selected randomly in order to reduce the likelihood that transmissions from different devices will occur a third the same time.

In still another aspect of some but not necessarily all embodiments consistent with the invention, for some applications in which the devices have different requirements regarding what constitutes an acceptable delay, devices with stricter requirements are allowed to use higher transmission powers for achieving higher receive transmission powers than those with less strict delay requirements. In this way the devices with strict delay requirements will likely be successful in their RA attempts.

These and other aspects are described in further detail in the following. To ease the description, a specific deployment is considered that adopts the terminology used in IEEE 802.11-compliant systems. Specifically, the network nodes are referred to as access points (APs) and the clients as stations (STAs). FIG. 1A is a system diagram to illustrate some of these points. The exemplary system 100 comprises network node (AP) 107 that serves one or more wireless communication devices here illustrated as a first wireless communication device 101 (STA1), a second wireless communication device 103 (STA2), and a third wireless communication device 105 (STA3). Each of the first, second, and third wireless communication devices 101, 103, 105 communicates information to the network node 107 by means of random access transmissions. As used throughout this description, the term "information" is used broadly to refer to any type of data that can be communicated between a wireless communication device and a network node, including but not limited to information conveyed when making an initial access to the network node (association) and information obtained by the wireless communication device (e.g., generated internally or relayed from another device) that is associated with an application or network function (e.g., voice, text, or control information).

Figure 1B:
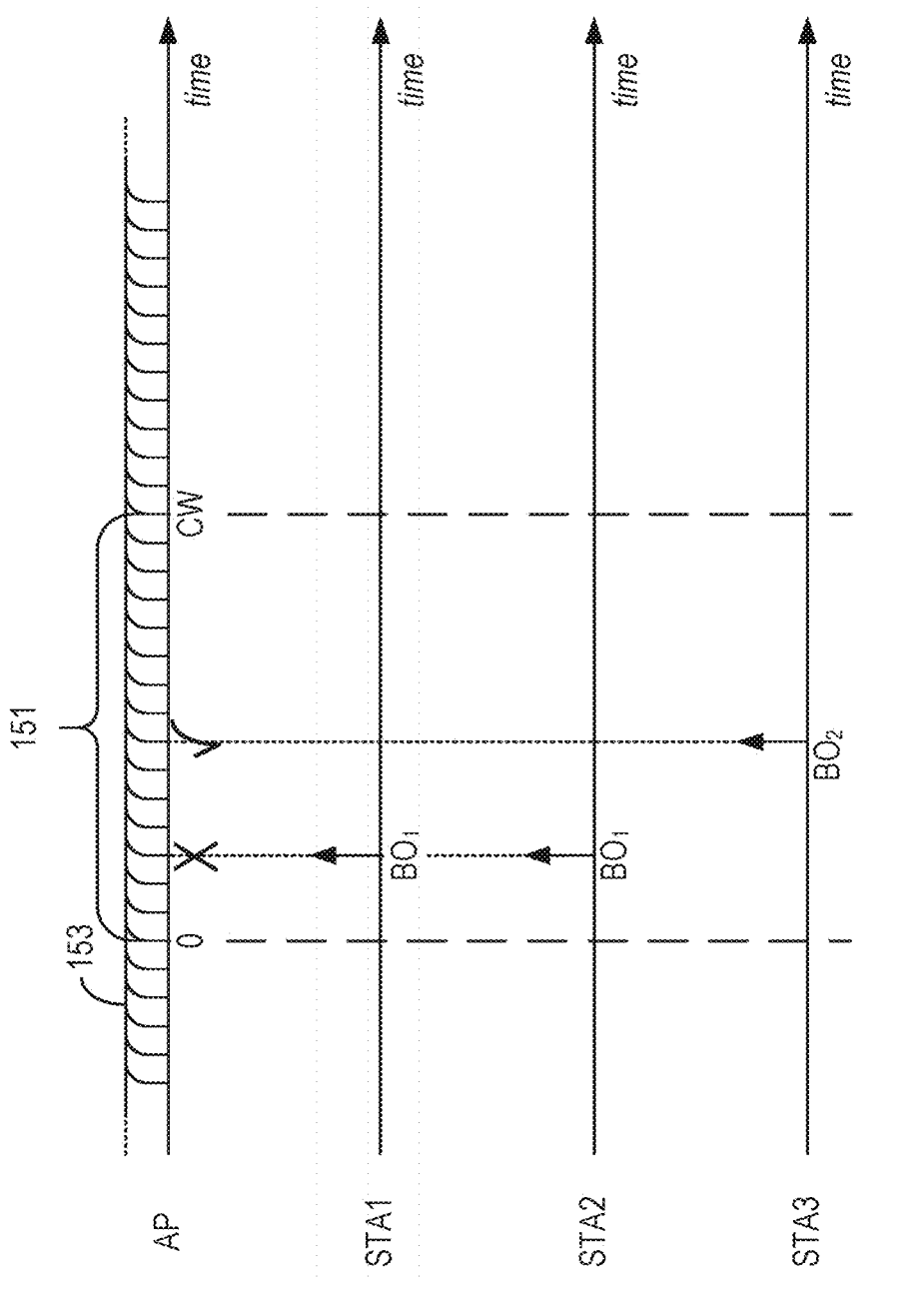
FIG. 1B is a diagram illustrating a contention window and aspects of a back-off strategy employed exemplary embodiments.

FIG. 1B is a diagram illustrating a contention window 151 and aspects of a back-off strategy employed exemplary embodiments. In this example, the air interface between the AP and the STAs that it serves is divided into a number of time slots 153. Assuming that it is idle, each time slot represents a transmission opportunity for the STAs. In order to reduce the likelihood of a collision between the transmissions of several STAs, each STA draws a number from the contention window 151. In this example, STA1 and STA2 have both drawn the same number, $BO_1$. STA3 has drawn a different number, $BO_2$. Each drawn number corresponds to an amount of time delay that must elapse, relative to a first slot 153 within the contention window 151, before transmission of information is permitted to occur. Since each consecutive number corresponds to a consecutive slot 153 within the contention window 151, each STA's transmission time is determined by the STA's drawn number from the contention window 151. For this reason, STA1 and STA2 both transmit after the delay $BO_1$ has elapsed, and this results in a collision at the AP (represented by the "X" in the figure). By contrast, STA3 does not transmit until the delay $BO_2$ has elapsed, and this results in a successful reception of STA3's information at the AP (represented by the check mark in the figure).

Figures 2A, 2B:
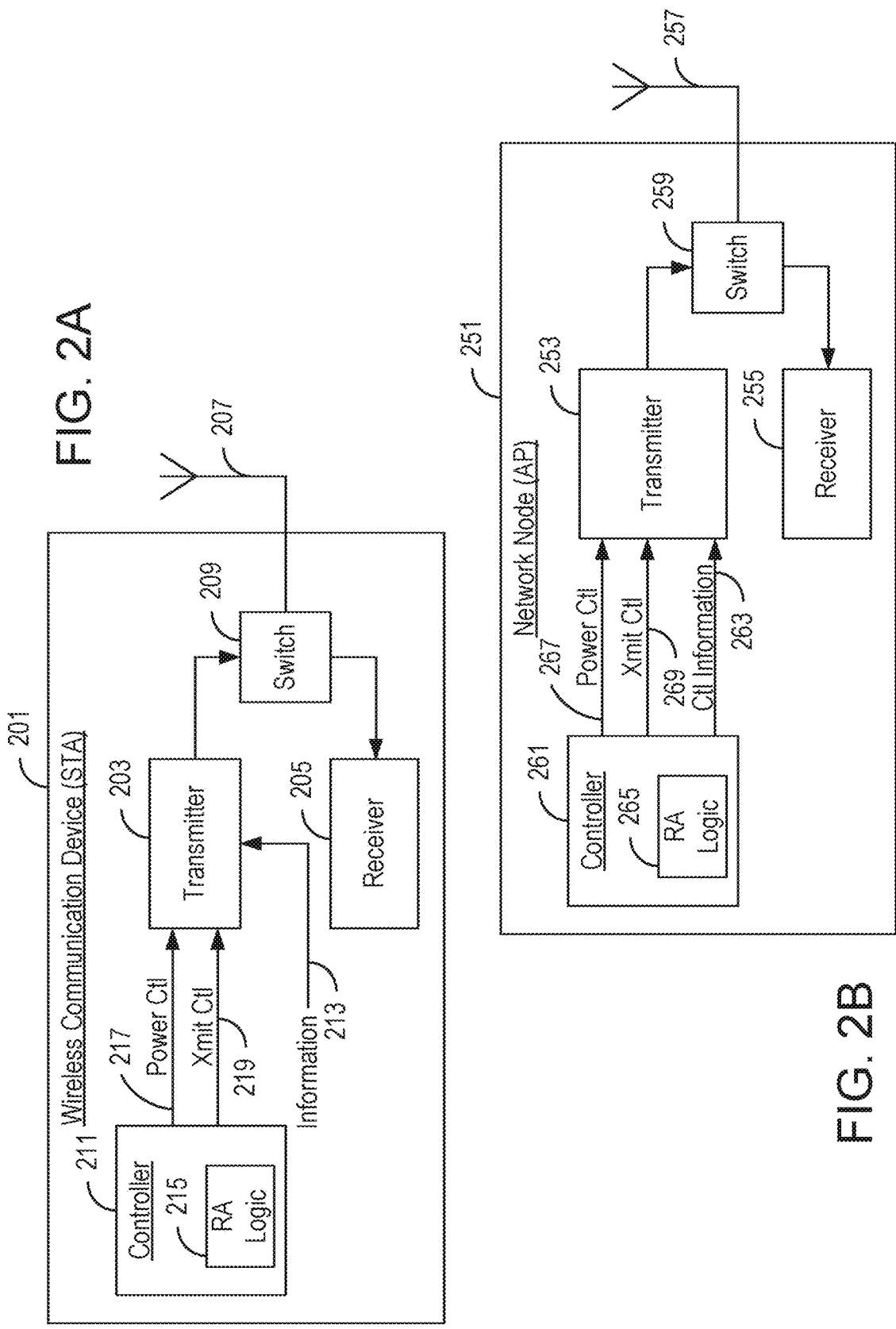
FIG. 2A is a block diagram of an exemplary wireless communication device in accordance with embodiments consistent with the invention.
FIG. 2B is a block diagram of an exemplary network node in accordance with embodiments consistent with the invention.

FIG. 2A is a block diagram of an exemplary wireless communication device 201. The wireless communication device 201 comprises a transmitter 203 and a receiver 205 that respectively transmit and receive information via an antenna panel 207. A switch 209 is also provided to allow the transmitter 203 and receiver 205 to share access to the antenna panel 207. The wireless communication device 201 is further configured with a controller 211 which, among other functions, includes random access logic 215 that enables the controller 211 to provide suitable control signals, including a power control signal 217 and a transmit control signal 219, that are compliant with the random access strategy described herein, when it is desired to transmit information 213 on the random access channel.

FIG. 2B is a block diagram of an exemplary network node 251. The network node 251 comprises a transmitter 253 and a receiver 255 that respectively transmit and receive information via an antenna panel 257. A switch 259 is also provided to allow the transmitter 253 and receiver 255 to share access to the antenna panel 257. The network node 251 is further configured with a controller 261 which, among other functions, includes random access logic 265 that enables the controller 261 to provide suitable control signals, including control information 263, a power control signal 267, and a transmit control signal 269, that are compliant with the random access strategy described herein.

Figure 3:
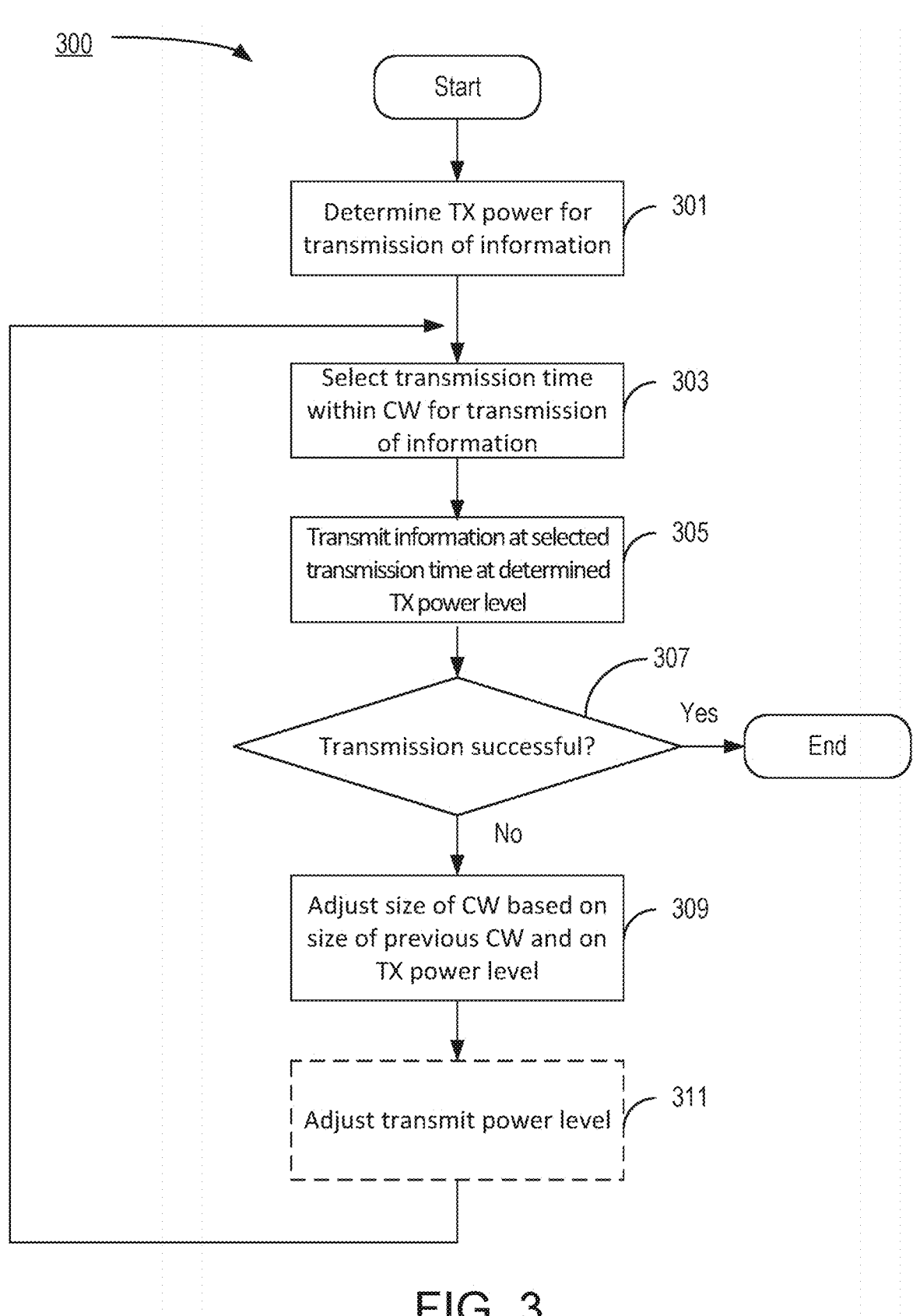
FIG. 3 is, in one respect, a flowchart of actions performed by a wireless communication device in accordance with a number of embodiments consistent with the invention.

To illustrate aspects of embodiments consistent with the invention, FIG. 3 is, in one respect, a flowchart of actions performed by a wireless communication device 201 to transmit information on a random access channel of a network node 107 in accordance with a number of embodiments. In other respects, the blocks depicted in FIG. 3 can also be considered to represent means 300 (e.g., hardwired or programmable circuitry or other processing means) for carrying out the described actions.

As shown in FIG. 3, the process includes determining a first transmit power level for a transmission of the information (step 301). As will be discussed further below, the transmit power levels are configured to be different among the different wireless communication devices (e.g., STA1, STA2, STA3) such that, in the event of a collision, the transmission performed by one of the devices will be received at a sufficiently higher power level than transmissions performed by other devices, and will accordingly be much more likely to be successfully received despite the collision.

Next, a first transmission time is selected for the transmission of the information (step 303), wherein the selected first transmission time is determined by a number drawn from a first contention window (e.g., an initial contention window set at $CW_{min}$). As mentioned earlier, selection can be made randomly between zero and the maximum contention window size. The STA then uses the randomly-drawn number as a basis for selecting the RA resource. For example, the STA may adopt a strategy in which it counts the number of idle time slots as they occur and then transmits its message if this number has reached the drawn number. In this sense, the drawn number corresponds to a transmission time for the message since it defines an amount of delay that must elapse starting from a first transmission opportunity before transmission of the information occurs.

At the selected first transmission time, the information is transmitted at the first transmit power level (step 305).

If the transmitted information was successfully received by the network node ("Yes" path out of decision block 307), then the transmission process is complete.

However, if the transmitted information was not successfully received by the network node ("No" path out of decision block 307), then the size of the contention window is adjusted (effectively making it a second contention window, different from the one previously used) with adjustment being based on a size of the first contention window and also on the first transmit power level (step 309). In some embodiments, this means increasing the size of the contention window (e.g., as in an exponential backoff strategy), with the amount of increase being based on the first transmit power level such that a greater increase is applied if the first transmit power level is higher than other transmit power levels that could have been used for the failed transmission. In some alternative embodiments, the STA may use an exponential back-off strategy in case the higher transmission power is used and fails (i.e., in order to decrease the likelihood of another collision) and conversely keep the size of the contention window static in case the lower transmission power level was used and failed. Accordingly, both the size of the contention window and also the transmit power level are considered when deciding how (if at all) to adjust the size of the contention window.

Then, in an optional step (present in some but not necessarily all embodiments consistent with the invention), the transmit power level may be adjusted (step 311). For example, the transmit power level can be increased by a given step size (e.g., predefined or alternatively provided by the network node) to further increase the likelihood of successful reception (i.e., due to capture) in the event of a collision on the next transmission attempt. As an example, a step size can be 5 dB to provide a meaningful enough difference between receive power levels to enable capture of the signal having the higher receive power level. Step sizes greater than 5 dB are also used in alternative embodiments.

Processing then reverts back to step 303, where a second transmission time is selected for the transmission of the information. Here, the selected second transmission time falls within the adjusted (second) contention window. When the size of the second contention window is greater than that of the first contention window, the likelihood of a collision is further reduced.

The information is then transmitted at the adjusted (second) transmit power level at the selected second transmission time (step 305).

Figure 4:
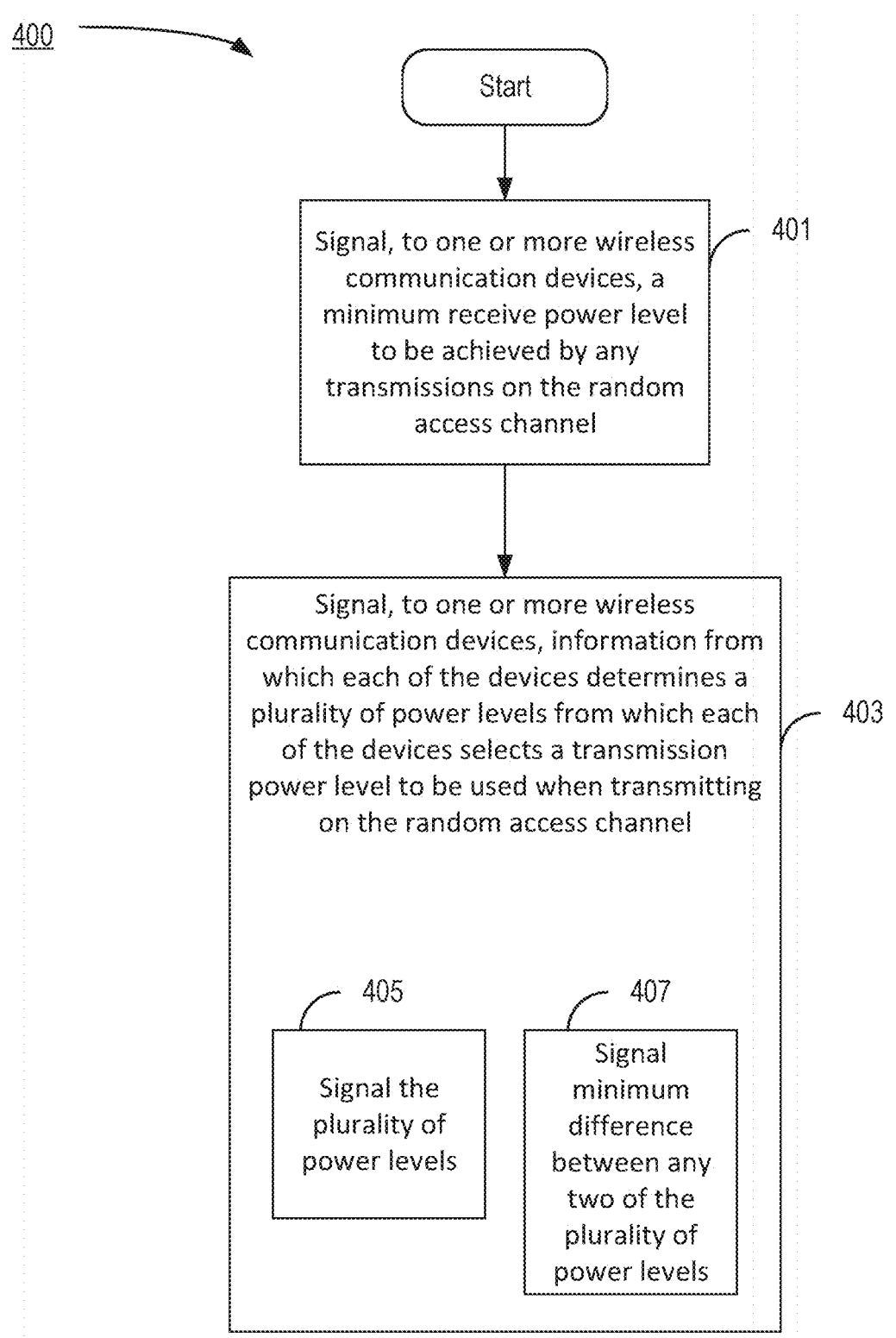
FIG. 4 is, in one respect, a flowchart of actions performed by a network node in accordance with a number of embodiments consistent with the invention.

To further illustrate aspects of embodiments consistent with the invention, FIG. 4 is, in one respect, a flowchart of actions performed by a network node 251 to control transmission, by one or more wireless communication devices, of information on a random access channel of a network node 107 in accordance with a number of embodiments. In other respects, the blocks depicted in FIG. 4 can also be considered to represent means 400 (e.g., hardwired or programmable circuitry or other processing means) for carrying out the described actions.

As shown in FIG. 4, the process includes signaling, to one or more wireless communication devices, a minimum receive power level to be achieved by any transmissions by the one or more wireless communication devices on the random access channel (step 401). The process further includes signaling, to the one or more wireless communication devices, information from which each of the wireless communication devices determines a plurality of power levels from which each of said one or more wireless communication devices selects a transmission power level to be used when transmitting on the random access channel (step 403). The signaling from the network node 251 to the one or more wireless communication devices can be performed in a number of ways. In one example, the signaling is performed in a beacon frame. In an alternative example, the signaling is performed in a Trigger Frame. The particular form of signaling employed in this respect is not an essential aspect of inventive embodiments, and other alternatives are contemplated within the scope of inventive embodiments.

The information can be any of a number of different forms, all of which are contemplated to be within the scope of the invention. In one example, the information expressly indicates the plurality of power levels (step 405). In another example, the information indirectly indicates a plurality of power levels by specifying a minimum difference between any two of the plurality of power levels (step 407).

In some but not all embodiments consistent with the invention, the minimum difference between any two of the plurality of power levels (regardless of how they are specified) is 5 dB or greater.

To illustrate the advantages with the herein-described technology, simulation results are provided. These simulations are based on RA attempts made according to the approach standardized in IEEE 802.11ax, where the RA essentially is done on different UL resources using Orthogonal Frequency Division Multiple Access (OFDMA) technology. Accordingly, the invitation to perform RA is made by the AP through the transmission of a trigger frame. Full details of this can be found in the corresponding IEEE specification and are known to those of ordinary skill in the art. Accordingly, in the following description, only those key features of the standard that are relevant for the inventive embodiments are highlighted.

Consider a situation in which the channel bandwidth is 20 MHz with 9 Resource Units (RUs) being available. The Trigger Frame (TF) contains information indicating how many of the 9 available RUs are allocated for use by RA. Typically, the higher the expected demand on RA by the AP, the higher the number of RUs that are allocated. A STA that wants to perform RA initiates a back-off (BO) counter with a random number between 0 and $CW_{min}$ (the initial size of the contention window). When the STA receives the TF it decreases the BO counter with the number of RUs allocated for RA. If the BO counter reaches 0, i.e., if the BO counter is 0 or negative, the STA randomly selects one of the RUs available for RA and transmits the RA message. If the BO counter does not reach 0, the STA waits for the next TF and then continues to decrease the BO counter as described above.

With this scheme a collision occurs if two or more STAs decrement their BO counters to zero (or below zero) with the same TF, and then select the same RU out of the indicated RA-RUs. In the event of a collision, each of the STAs has to restart the RA procedure by initiating the BO counter with a random number between 0 and 2*CW+1, where CW represents the size of the contention window that was most recently used in an unsuccessfully-received transmission. For instance, if the CW in the first attempt was 7 and transmission resulted in a collision, in the next attempt it will be 15.

In an aspect of embodiments consistent with the invention, the RA strategy includes trying to ensure that, in case there is a collision, one of the received RA messages will be correctly received as a result of the RA messages being (with some probability) received with sufficiently different receive power levels.

It is not possible to ensure that all of the STAs' RA messages will be received with different powers such that there is always one signal that can be correctly received. There are essentially two reasons for this. First, since the signals will interfere with one another and one needs to have a minimum signal-to-interference-ratio (SIR) for the reception to be successful, there is only a limited granularity in what relative receiver power should be targeted. Second, there will be some channel variations that need to be taken into account by having some margin in addition to the minimum SIR required for successful reception. For this reason, simulation evaluations were limited to the cases when 2 or 3 different receiver power levels are assumed at the AP.

Throughout the discussion, it is assumed that there are in total 10 STAs that potentially want to perform RA using the approach described above. All STAs are assumed to have a packet arrival that is a Poisson process with a mean of 1 packet/s. As soon as a STA has at least one packet to transmit it starts the RA. Until a successful RA message has been received, the incoming packets are buffered and once the RA message is successful the STA will be scheduled and able to send all packets in the buffer.

The AP sends a TF every 100 ms. The impact of the number of RUs for RA is studied by varying the number of RUs for RA.

The number of TF intervals for a successful RA attempt is used as the figure of merit (FoM). As an example, suppose a STA generates a packet and its BO counter is initiated to 5. Moreover, suppose each TF indicates that 3 RUs are allocated for RA. When the first TF is received after the RA start, the BO counter is decreased to 5−3=2, and consequently no RA attempt is made. The STA waits for the next TF, and when this is received the BO counter is decreased to 2-3=−1. Since this is 0 or less, the STA randomly selects one of the 3 RUs allocated for RA and transmits the RA message. If the transmission is successful, the delay is in this case 2 TF intervals. If the transmission instead fails, the BO counter is restarted after being reinitialized with a new random number, this time selected in a range extending from 0 up to an increased contention window. Suppose that this time the BO counter is initialized to 14. Analogously with the above-stated exemplary conditions, the STA will receive TFs and decrease the BO counter to 11, 8, 5, 2, and finally to −1 after having received in total 5 TFs. Assuming that RA transmission is successful this time, the transmission delay would be 2+5=7 TF intervals (i.e., the total number of TF intervals required for successful reception, including the two associated with the failed transmission attempt).

Note that the delay above refers to the first packet that caused the STA to initiate the RA procedure. In some embodiments, in case additional packets arrive before the BO counter has reached 0, the delays for each of these packets is calculated as the time from when it arrives up to the time that the RA transmission is successful, so the delay for these packets is smaller than for the first packet. In the statistics presented, no distinction is made between whether a packet arrived in the buffer as the first packet or if the STA was already in the process of random access. The assumption here is that additional packets arriving before the BO counter has reached 0 are placed into a buffer, and that the information that the STA is transmitting is a buffer status report, indicating its uplink requirements. Upon successful receipt of the buffer status report, the AP will schedule a dedicated (non-RA) uplink resource for the STA to use when transmitting all of the packets.

Figure 5A:
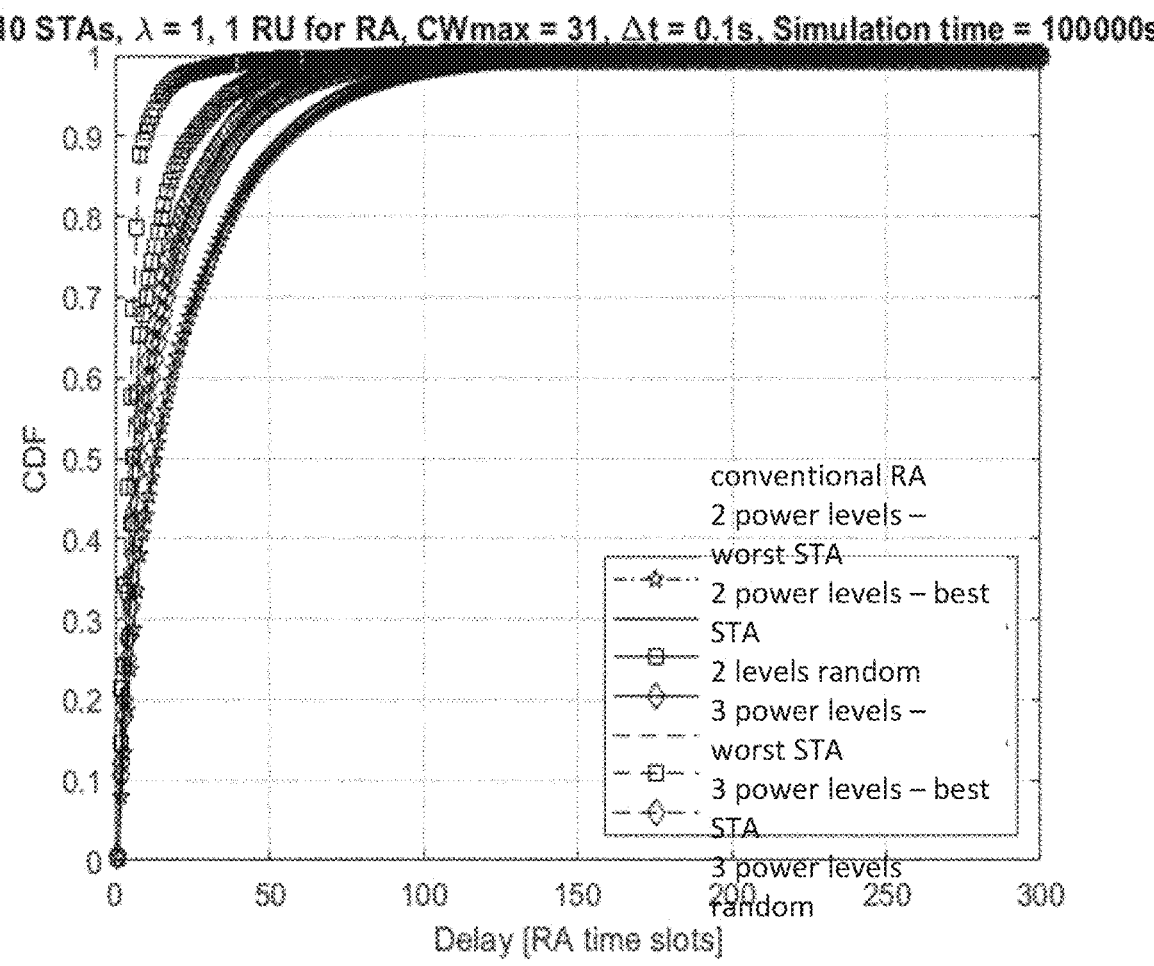
FIGS. 5A, 5B, 6A, 6B, 7A, 7B, 8A, and 8B are each a set of graphs showing comparisons of performance simulations of various inventive embodiments.
Figure 5B:
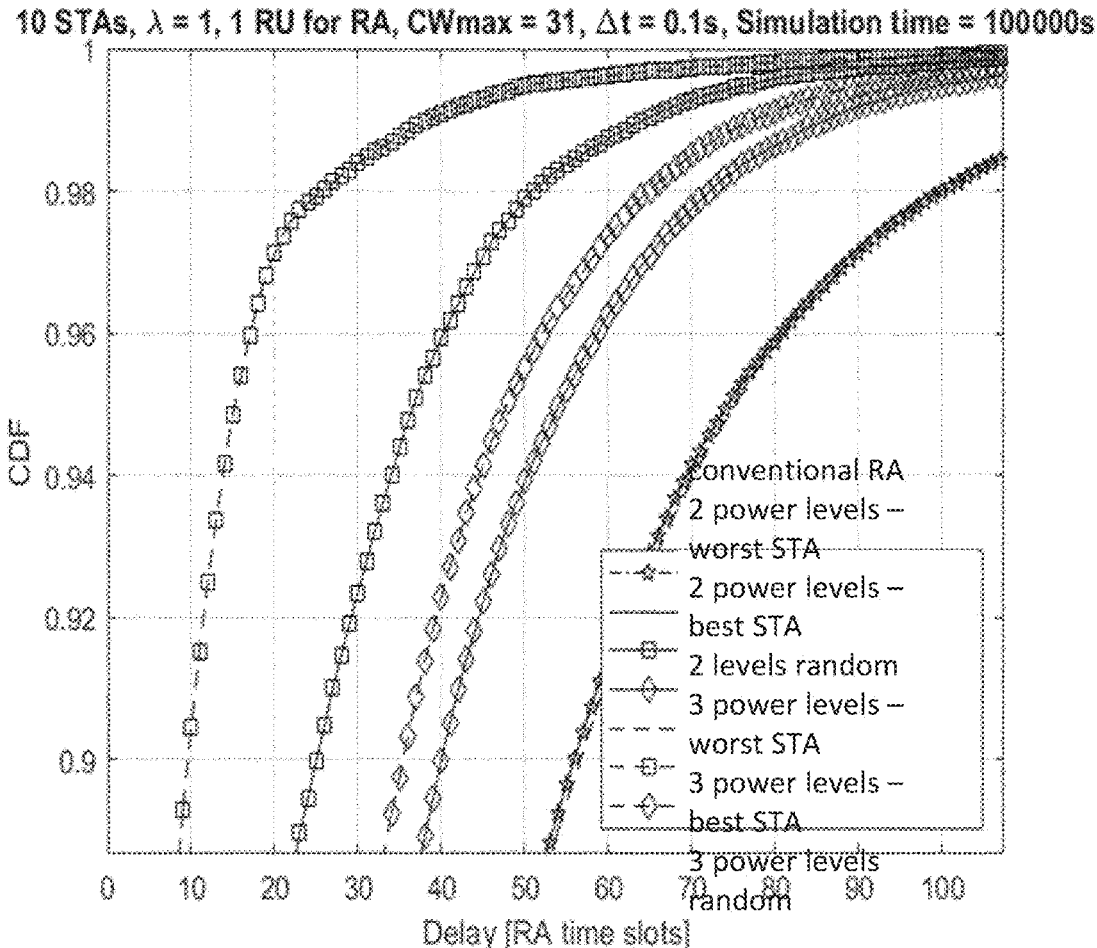

FIG. 5A is a series of graphs comparing the cumulative distribution function (CDF) for the delay when capture is not employed (conventional technology) with a few different situations in which capture is exploited (e.g., by a network node configuring some wireless communication devices differently from one another such that one wireless communication device's RA transmissions will be received at a higher receive power level than those of others' transmissions). To make it easier to see how the different configurations differ from one another, FIG. 5B illustrates a magnified portion of the graph of FIG. 5A. The assumptions for each case are that there are 10 STAs, λ=1 for the Poisson process that defines the packet arrival rate, the number of available RUs is 1, CWmax=31, Δt=0.1 s, and the simulation time=100,000 s. The various curves with capture are obtained under slightly different conditions. In one respect, the effect of having 2 or 3 different power levels is studied. The higher the number of power levels there are to choose from, the lower the probability of having two STAs select the same power level and this translates into a higher probability of benefitting from the capture effect (i.e., of having one of the STA's transmissions successfully received). However, as discussed above, there is a practical limit with respect to how many different power levels are feasible to obtain.

As another aspect for comparison, simulations considered situations in which each one of the 10 STAs was allocated a power level that it was to use in every RA attempt and the corresponding performance for STAs having the lowest (worst) power level and the best (highest) power level were plotted. These results are also shown in FIG. 5A, with a magnified portion of the curves being reproduced in FIG. 5B for easier visibility. The implication of this type of arrangement is that if a STA that has been allocated the higher power level transmits at the same time as a STA that has been allocated a lower power level, the former will always succeed in the RA attempt whereas the latter will always fail.

As can be seen, the performance is significantly different depending on what power level has been allocated. Thus, allocating different power levels may be seen as an effective way of decreasing the delay for STAs having more strict delay requirements. What is noteworthy, however, is that the STAs allocated the lower power levels do not perform worse than what would have been the case if all STAs had been allocated the same power level. The reason for this is that the STA would in both cases experience a collision and would have increased the CW. Whether the other STA succeeds or also fails does not make any (noticeable) difference.

Also shown in FIGS. 5A and 5B is an evaluation of an approach in which each of the STAs selects its power level randomly for each RA transmission, rather than using the fixed power level all the time. One might expect that this would result in a performance that is the average between being the performance associated with static allocation to one of the different power levels, and this is what was found in most cases of the simulations. However, in some cases it turns out that this approach may actually be better than the expected average performance, and in fact may even result in a better result than that for a STA that is always allocated the highest power level. Although this at first may seem counterintuitive, the explanation is as follows. In the case of fixed power allocation, there is a risk that two STAs both having the highest power level allocated to them will transmit at the same time, in which case there will not be a capture. Both these STAs will have to adjust (e.g., double) the CW and there is a certain probability that they will again collide. However, if instead the power is selected randomly at every attempt there is a chance that the two STAs will select different power levels such that one of them will be successful. This effect will only appear in rather extreme cases, corresponding to whether one is considering the CDF at, say, 99.9% or higher.

Figure 6A:
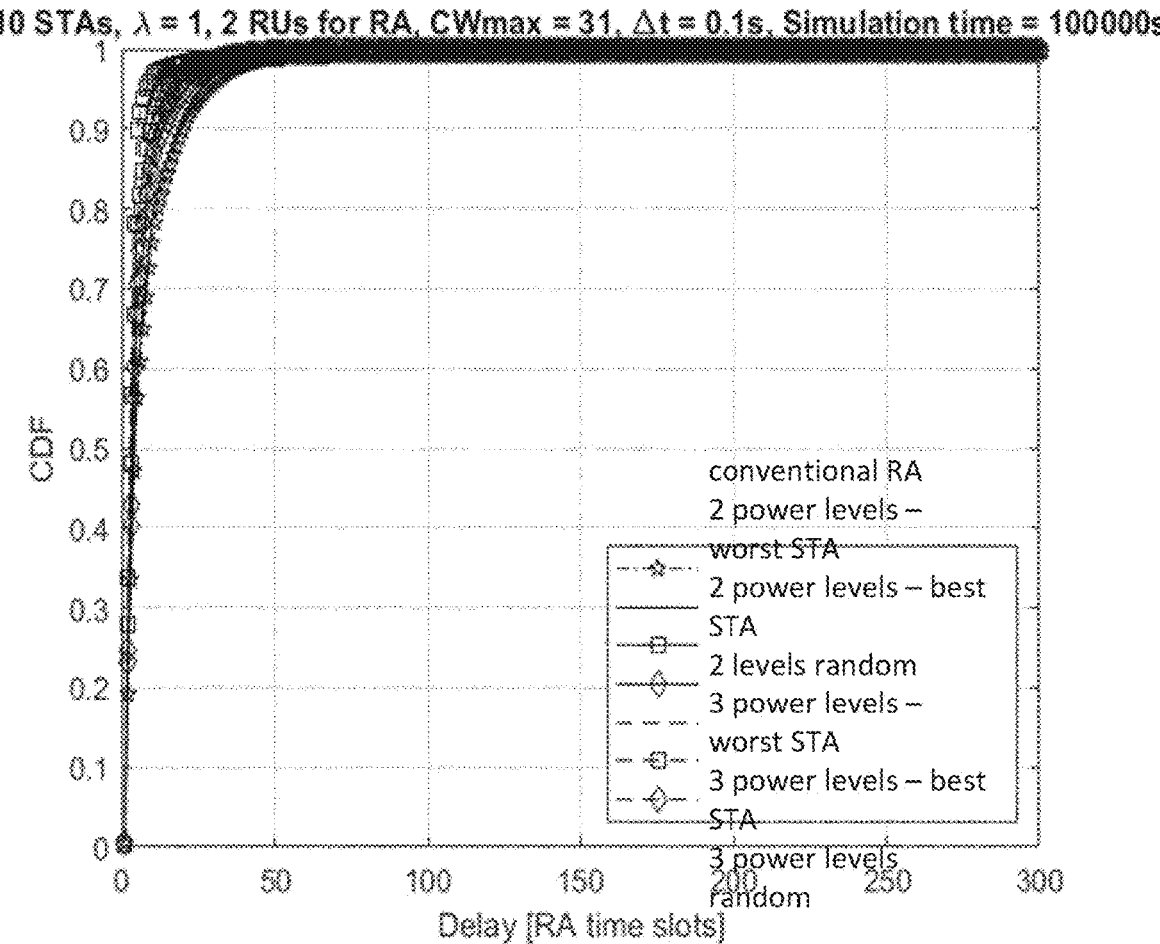
Figure 6B:
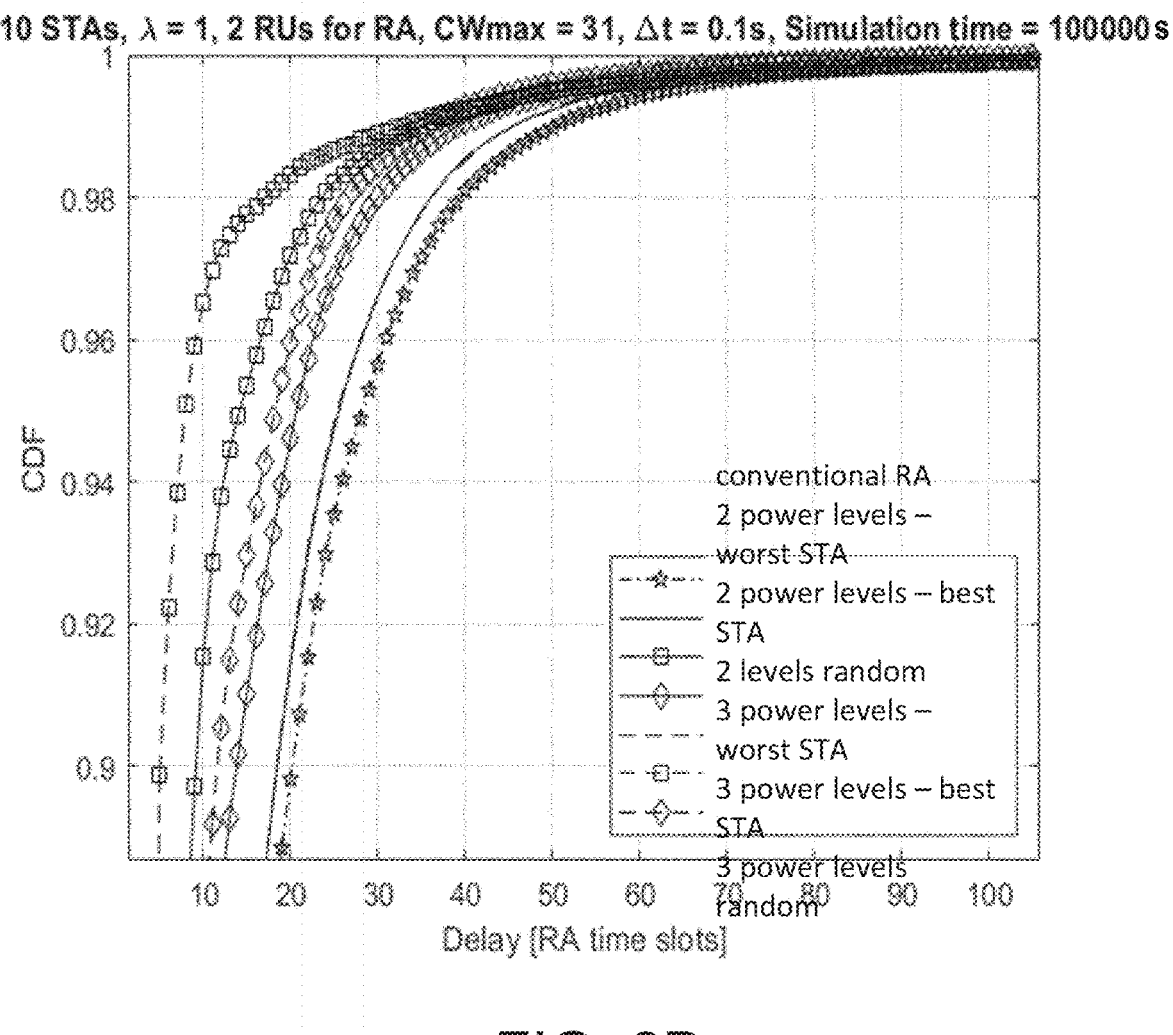
Figure 7A:
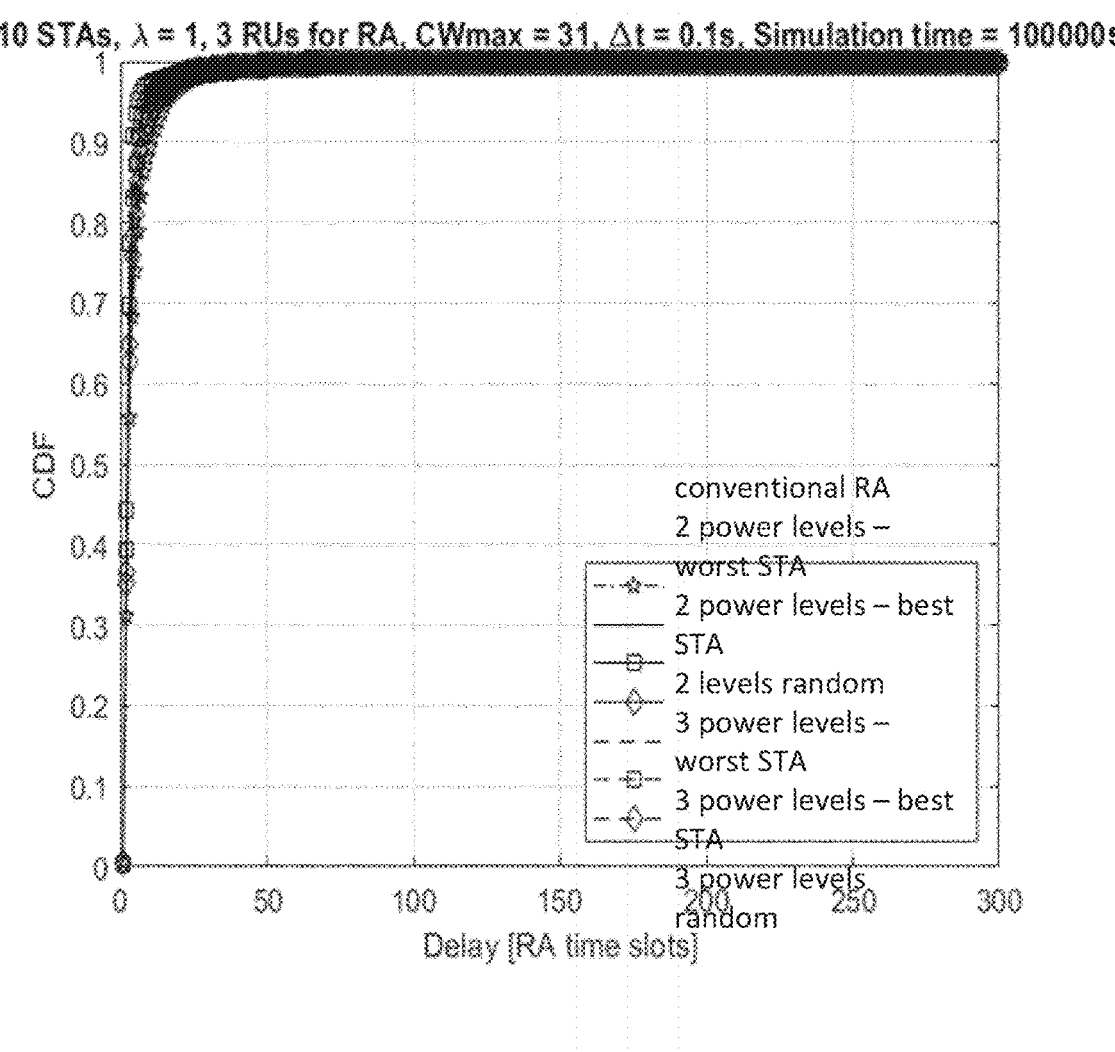
Figure 7B:
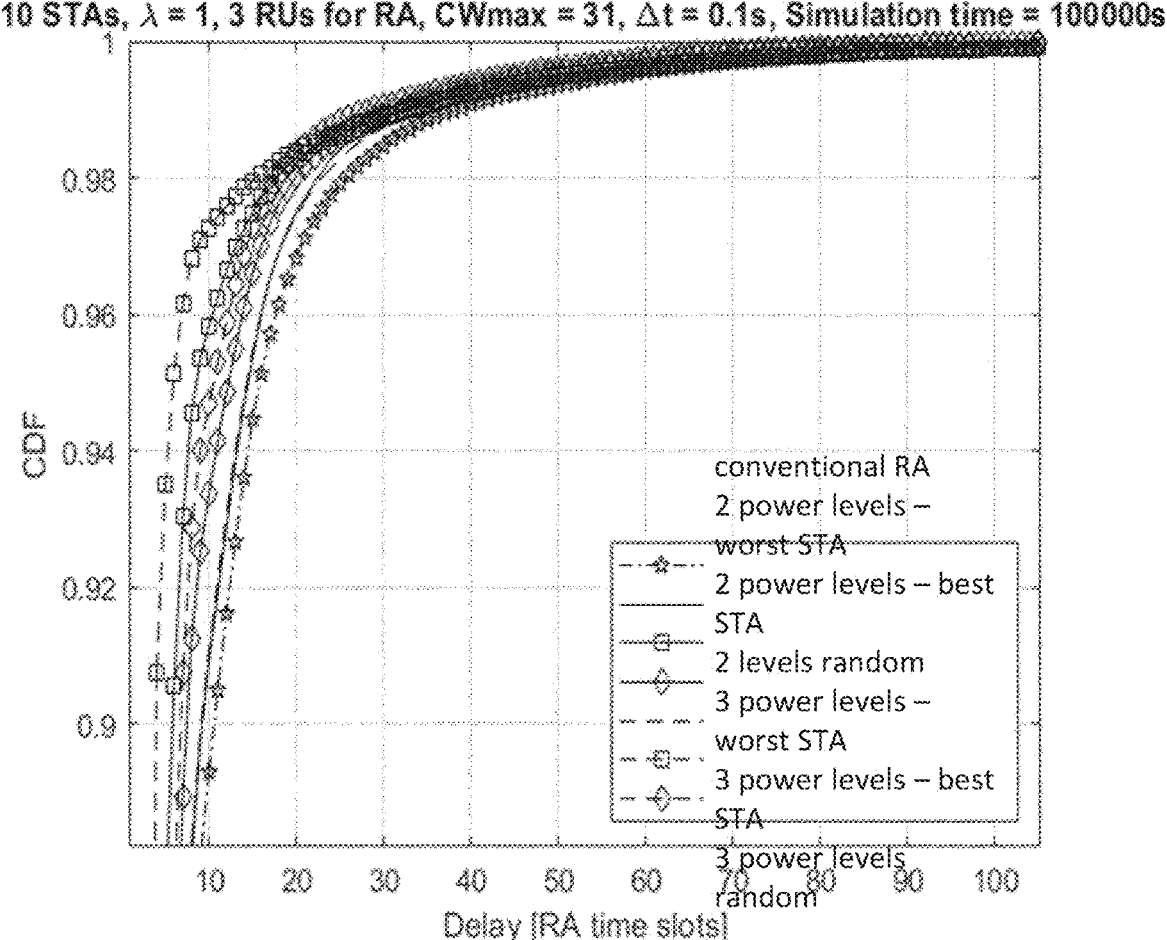

A similar set of simulations was performed with the same assumed conditions as stated above except that in these instances the number of RUs allocated for RA is 2 for the results presented in FIGS. 6A and 6B (with FIG. 6B illustrating a magnified portion of the graph of FIG. 6A), and 3 for the results presented in FIGS. 7A and 7B (with FIG. 7B illustrating a magnified portion of the graph of FIG. 7A).

It can be seen from these simulation results that as more RUs are allocated for RA the delay will be reduced. However, as can be readily seen from the figures, a significant gain from the capture effect is seen in all cases. As already mentioned, the fact that a collision in case of capture still allows a RA message to be correctly received at the AP may also allow for being less conservative when it comes to increasing the contention window. One way to view this is that in contrast to a situation in which all transmission fails whenever a collision occurs (in which case the transmission attempt can be viewed as a waste of the channel resources), in case of capture one RA message is received just as would have been the case without a collision.

Figure 8A:
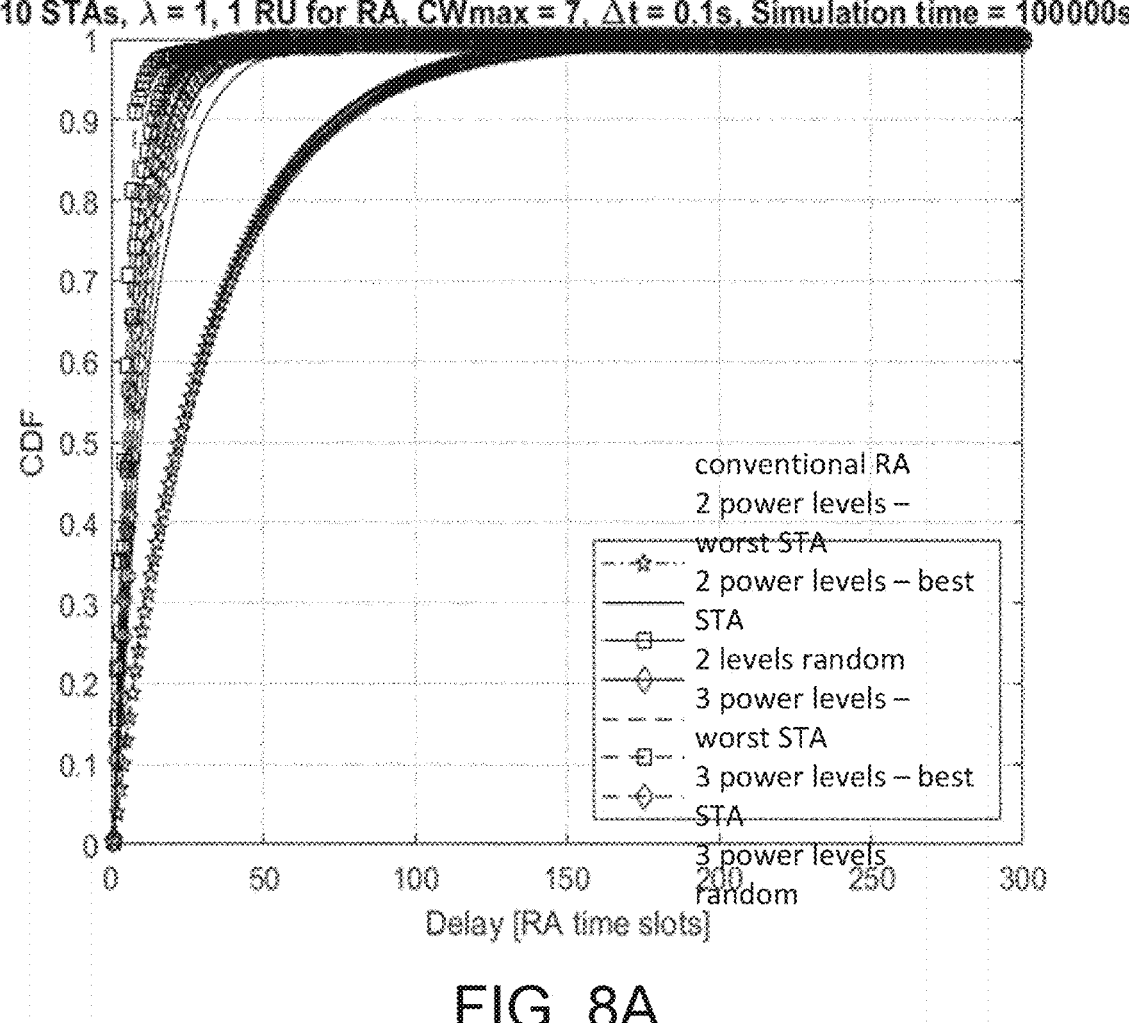
Figure 8B:
Figure 8B:
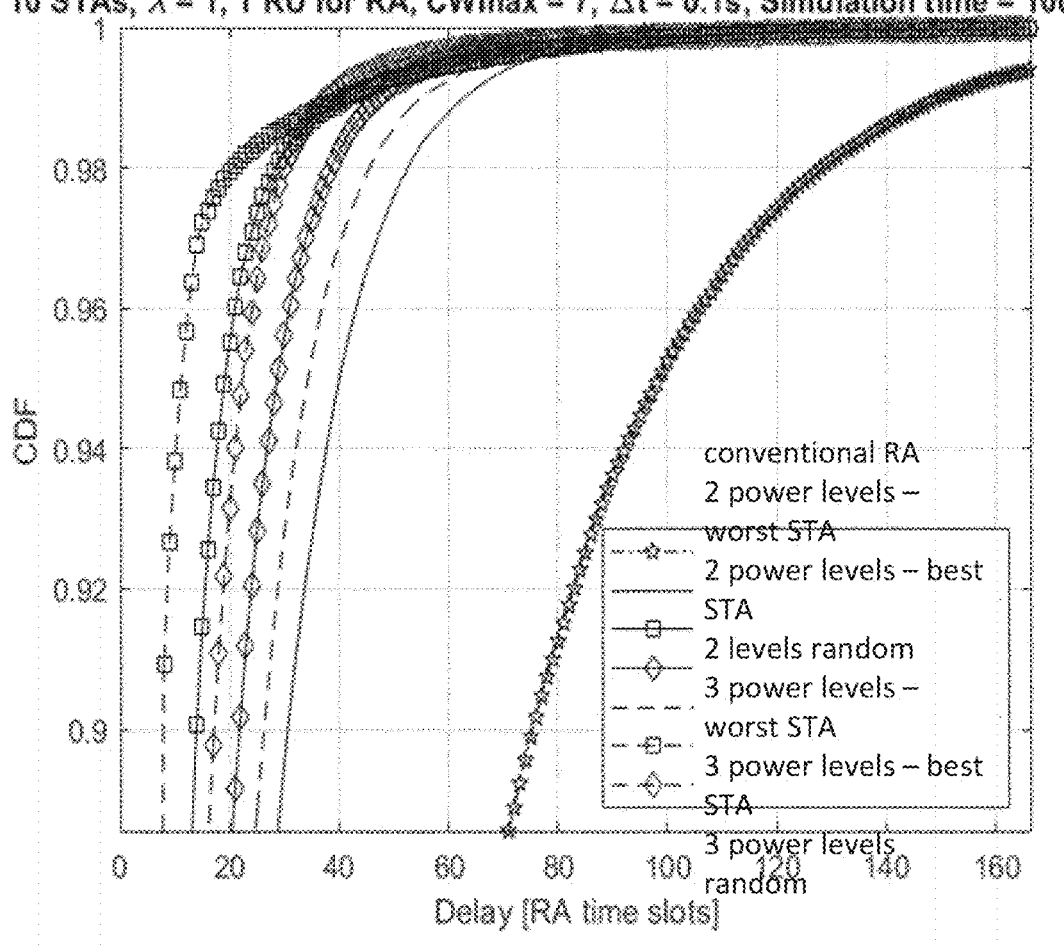

To see this effect more clearly, another set of simulations was performed, but now with an approach in which the CW was not updated, but instead kept at 7 irrespectively of what transmission attempt it was. The results are depicted in FIGS. 8A and 8B (with FIG. 8B depicting a magnified portion of the graphs of FIG. 8A). The parameters used in these simulations are the same as when generating FIG. 5A with the only difference being that the contention window is kept at 7. Referring to FIGS. 8A and 8B, it can be seen that the conventional approach, in which there is no attempt to cause one STA's transmission to have a higher receive power level than that of another, performs worse than the corresponding performance in which the CW was adjusted with each failed transmission attempt. By contrast, approaches making use of the capture effect perform better with the static contention window size compared to corresponding performance in which the contention window is increased. The reason is that without the capture effect, the system starts to become overloaded in that there are collisions and consequently retransmissions since every collision implies that every transmission fails. Conversely, when one benefits from the capture effect then even if there is a collision there is a good chance that one of the transmissions is successful so that it is advantageous to be more aggressive when it comes to selection of contention window size.

Having explained the basic idea of trying to ensure that device performance will benefit from the capture effect at the receiver and having illustrated the gain that can be achieved, the discussion will now focus on an exemplary scenario in which these aspects can be applied. Service Periods (SPs) have been recently introduced in the IEEE 802.11be standard. A Service Period is a period of time within a Transmit Opportunity (TXOP) reserved by the AP that may be reserved for latency critical transmissions. So far there have been no discussions regarding the details of the channel access mechanism to be used during a SP.

At least two operation modes may be activated by the AP during the SP: either the contention (pre-ax) or the scheduled (ax) mode depending on the number of critical STAs that can operate during the SP. The AP can set the contention mechanism during an SP as follows:

If the number of STAs with uplink (UL) critical traffic is large, the AP activates the ax scheduled mode and all collisions are avoided by scheduling UL transmissions using OFDMA.

If the number of STAs with UL critical traffic is medium or low, the AP lets the critical STAs contend during the SP for channel access by using the contention based Uplink OFDMA-based random access (UORA) mechanisms. Additionally, in order to differentiate between latency critical STAs, the AP may also use the capture effect described herein by, for example, setting the transmit power in the critical STAs to create, for example, two levels of critical data. This selection may be communicated by the AP when it sends a TF.

Embodiments consistent with the invention all utilize the concept of "capture". In its simplest form, a capture means that if two signals are received having sufficiently different power levels, the signal with the highest power can be correctly decoded (i.e., will be received and decoded correctly). The signal with the lowest power will not be decoded correctly. This is in contrast to the situation in which the two signals are received with similar powers; both signals will consequently fail to be decoded correctly. An idea utilized in inventive embodiments is thus to try to benefit from this "capture effect" by deliberately trying to make sure that there is a reasonably high probability that if two or more signals are received at the same time (i.e., in the event of a collision) one of the signals will be uniquely received with the highest power. Even if there is a risk that more than one of the received signals will be received with the highest power (in which case no signal can be successfully received), there will also be situations when the capture effect will lead to a successful reception, so that statistically there will be a system-wide gain in RA performance.

Various embodiments take into consideration some practical aspects. One such aspect is that there is a limit with respect to what received power levels are possible. Since a STA has a maximum power and there is a pathloss between the STA and the AP, there is an upper limit for the received power from this STA. There is also a minimum received power that is required in order to be able to correctly receive the signal from a STA, since there is a minimum required SNR associated with successful reception. This leads to a requirement that the STA must not transmit at a power level that will result in a receive power level that is lower than that which is required to achieve the minimum required SNR for successful reception. Consequently, a STA can only change its power within the range from its maximum power down to the level at which its signal can still be correctly received. If one now also takes into account that the difference in received powers for different signals must differ by a certain amount for capture to occur, say 5 dB, this naturally puts a limit on how many different power levels can be used. As an example, suppose that the highest power is 10 dBm and the lowest power that can be used is 0 dBm. Then with a minimum step of 5 dB, three different power levels are possible, namely 0, 5, and 10 dBm. If instead the minimum step is 10 dB, then only two different power levels would be possible, namely 0 and 10 dBm.

The STA needs to have this knowledge, (i.e., what different transmission power levels can be used). The maximum transmission power may be signaled from the AP, it may be defined by the applicable standard, or it may simply be an implementation limitation. The minimum transmission power may be signaled or it may be derived by the STA based on the required received power and the pathloss between the STA and the AP.

Having these basics properties in mind, one can think of different strategies for selecting the transmission powers at the individual STAs. The power may be selected autonomously by the STAs or to some extent controlled by the AP. The power may be selected randomly or with some specific strategy. The selection of the power may influence how the contention window is selected. For example, since using a lower transmission power is more friendly to other devices (gives a higher probability that another STA will be successful thanks to capture), this may be awarded by using a contention window that is not increased as much in case of a transmission failure.

In the following, different exemplary embodiments are described that build on the aspects presented above.

Embodiment 1—RA with Capture

According to this embodiment, the STAs are requested to use transmission powers in such a way that if the transmissions from two STAs are colliding, the received powers from the STAs should be sufficiently different to allow for that the signal received with the highest power can be correctly decoded. For example, the network node can signal the target receive power level to each STA, with one or more of the STAs receiving higher target levels than others. Each STA then determines for itself what transmit power level to use in view of its link budget, to achieve a value that is at least the target receive power level.

Embodiment 2—Targeted RX Power Based on Delay Requirements

According to this embodiment, the priority of each STA's transmissions is used as a basis for increasing or decreasing the likelihood of successful packet reception in the event of a collision by selecting the transmission power for each STA such that the corresponding received power will be relatively high in case the STA's transmissions have a high priority, and will be relatively lower in case it should have low priority.

One reason for the high and low priority, respectively, may for example be that the applications are more or less delay sensitive, respectively.

The delay requirements can be expressed in terms of so-called Access Categories (AC). This allows the STA to map its requirements to a smaller amount of already well-defined QoS-categories. As an example, if the traffic is for the low-delay ACs (AC_VO—voice and AC_VI—video) then the STA will utilize the higher transmission powers (i.e., to increase likelihood of successful packet reception in the event of a collision), while if the traffic is for the ACs that allow for higher delays (e.g., AC_BK—background; AC_BE—best effort), then the STA will use lower transmissions powers.

Embodiment 3—Targeted RX Power is Selected Randomly

According to this embodiment, the used transmission power is selected randomly for a set of RA attempts. In an exemplary embodiment, each STA randomly selects its power level from a set of power levels. The set of power levels can be directly signaled as a set of levels (e.g., TX_pow1, TX_pow2, TX_pow3, . . . ). In a non-limiting alternative embodiment, the power levels are signaled as a minimum and a maximum transmit (or target receive) power level along with a step size to be used for generating a set of power levels spanning the minimum and maximum values.

Embodiment 4—the Used Transmission Power is Selected Randomly where the STA Independently Draws a Transmission Power for Every RA Attempt—Contention Window Update Depends on Used Transmission Power As illustrated above, it is normally a good idea to increase the contention window if this reduces the probability for yet another collision. However, as illustrated above, with the help of the capture effect it may be better to keep the contention window small. If a STA is using the higher transmission power and still experiences a failed attempt, it may be due to a collision and then it can be inferred that the other device involved in the collision has also likely failed in its transmission attempt. Conversely, if a STA is using a lower transmission power, then there is a certain likelihood that the other device used a higher power and by that was successful. Based on these inferences, the following embodiment includes a contention window update procedure that is a function of the transmission power used.

Specifically, the size of the contention window is increased to a greater extent if a transmission with a high transmission power fails than if a transmission with a low transmission power fails. As an example, suppose a case in which a STA is able to select between two different transmission powers. The STA may then use exponential back-off in case the higher transmission power is used and fails (i.e., in order to decrease the likelihood of another collision) and conversely keep the size of the contention window static in case the lower transmission power level was used and failed.

Embodiment 5—Target RX Power Based on Number of Transmission Attempts

As a means to reduce the spread in how many transmissions attempts are needed, this exemplary embodiment has the STA start at a low transmission power level and increases the transmission power in case of failures. The rational for this is that with this approach, if there is a collision between a RA packet sent for the first time and a RA packet that is retransmitted, the retransmitted packet will be more likely to succeed.

Embodiment 6—Selection of Number of Transmission Power Levels

In general, performance improves in relation to the number of different power levels that a STA can select from. However, as illustrated by the simulation results, the gain may become marginal. It is also so that how many distinct power levels are feasible to target depends on the required SIR, the maximum power of the STAs, and the different pathlosses between the STAs and the AP. As an example, suppose there are two STAs, each having a maximum TX power of 10 dBm. Moreover, suppose the pathloss for the two STAs are 80 and 95 dB, respectively. Finally, assume that the received power must be at least −95 dBm. Here both the TX power and the required RX power are exemplified under the assumption that the bandwidth of the signal is about 2 MHz, which is a good approximation in case of 802.11ax. Finally, suppose that the required SIR is determined to be 10 dB.

First consider an exemplary first device, STA1, with 80 dB pathloss. The minimum TX power that this STA can use is −95 dBm+80 dB=−15 dBm. The maximum is 10 dBm.

Then consider an exemplary second device, STA2, with 95 dB pathloss. The minimum TX power that this STA can use is −95 dBm+95 dB=0 dBm. The maximum is 10 dBm.

Since STA2 can only vary the TX power with 10 dB, it can only generate two different power levels at the receiver since it was required that the step between the levels was 10 dB.

STA1 can (in principle) generate 3 levels.

According to this embodiment, the number of power levels is calculated based on the minimum step between the different levels and maximum and minimum transmission power that is possible use.

Continuing this numerical example in Embodiment 6 and relating it to some of the previous embodiments, suppose that it is desirable to give STA1 priority in case of collision. The AP may then request that STA2 use the lower transmission power (i.e., 0 dBm) whereas STA1 is requested to use a sufficiently high power (e.g., 0 or 10 dBm).

If it instead is desirable to give STA2 priority in case of collision, STA 1 may for instance be requested to use the lower power level 0 dBm whereas STA 2 is requested to use 10 dBm.

In case it is desirable to randomize the power levels to get the same chance of success for both STA1 and STA2, the AP may request that STA 1 use the two power levels 0 and 10 dB with equal probability and that STA 2 use the power levels −15 dBm and −5 dBm with equal probability.

Finally, the AP could also exploit the differences in pathloss to create as much differentiation in received power level as possible. This means that in the example the AP would assign STA1 to 10 dBm because it is the only STA that can meet the third received power level. Thus, no STA is prioritized based on needs, but the number of RUs that would have a same power level collision is minimized.

Embodiment 7—Configuration Examples

As the RA can be used to schedule both associated and unassociated STAs, there can be benefits in allowing differentiated RA configurations based on whether the STA is associated or unassociated. For associated STAs that already have their Quality of Service (QoS) established, it could make sense for these to use the methods described in embodiments 1 to 6, whereas it makes sense for STAs that are not associated to use full power configuration in order to ensure that they can reliably associate. Thus, in one embodiment, the AP will signal whether the "power differentiation" is used for associated or unassociated STAs.

In another embodiment, the AP uses the "power differentiation" for a specific trigger frame (i.e., the Basic Trigger frame or for the Buffer Status Report Poll (BSRP)-Trigger frame).

Figure 9:
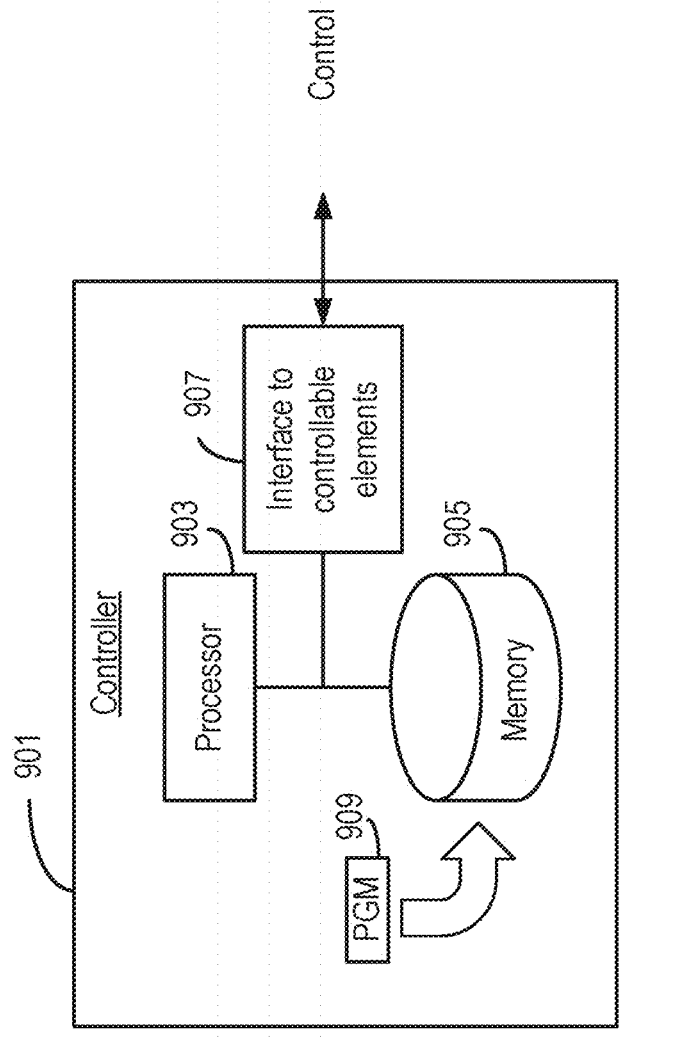
FIG. 9 is a block diagram of an exemplary controller that can be configured as a controller of a wireless communication device consistent with inventive embodiments, and alternatively configured as a controller of a network node consistent with inventive embodiments.

Aspects of an exemplary controller 901 that may be included in a wireless communication device 201 and/or in a network node 251 to cause any and/or all of the above-described actions to be performed as discussed in the various embodiments are shown in FIG. 9, which illustrates an exemplary controller 901 of a wireless communication device 201 and/or of a network node 251 in accordance with some but not necessarily all exemplary embodiments consistent with the invention. In particular, the controller 901 includes circuitry configured to carry out any one or any combination of the various functions described above. Such circuitry could, for example, be entirely hard-wired circuitry (e.g., one or more Application Specific Integrated Circuits— "ASICs"). Depicted in the exemplary embodiment of FIG. 9, however, is programmable circuitry, comprising a processor 903 coupled to one or more memory devices 905 (e.g., Random Access Memory, Magnetic Disc Drives, Optical Disk Drives, Read Only Memory, etc.) and to an interface 907 that enables bidirectional communication with other elements of the wireless communication device 201 The memory device(s) 905 store program means 909 (e.g., a set of processor instructions) configured to cause the processor 903 to control other system elements so as to carry out any of the aspects described above. The memory device(s) 905 may also store data (not shown) representing various constant and variable parameters as may be needed by the processor 903 and/or as may be generated when carrying out its functions such as those specified by the program means 909.

It will be understood from this description and accompanying figures that an aspect of described embodiments includes technology for performing random access transmissions in a wireless communications network. An aspect of the technology is that it results in random access transmissions from different wireless communication devices being received with sufficiently different power levels such that the transmission received with the highest transmission power can be correctly received even when different transmissions are received concurrently.

Embodiments consistent with the invention provide advantages over conventional random access technology. For example, inventive embodiments exhibit improved RA performance both in terms of the delay time until successful receipt of transmission, and also spectrum efficiency. In terms of delay, the average delay as well as the probability of experiencing vary large delays are decreased.

Inventive embodiments may also be introduced to work together with legacy devices, making it a feasible approach for improving the RA performance even when there is a mix of new and legacy devices in the network.

The invention has been described with reference to particular embodiments. However, it will be readily apparent to those skilled in the art that it is possible to embody the invention in specific forms other than those of the embodiment described above. Thus, the described embodiments are merely illustrative and should not be considered restrictive in any way. The scope of the invention is further illustrated by the appended claims, rather than only by the preceding description, and all variations and equivalents which fall within the range of the claims are intended to be embraced therein.

The invention claimed is:

1. A method of operating a wireless communication device to transmit information on a random access channel of a network node, the method comprising:

determining a first transmit power level for a transmission of the information by randomly selecting the first transmit power level from a plurality of fixed power levels;

selecting a first transmission time for the transmission of the information, wherein the selected first transmission time is determined by a number drawn from a first contention window, and wherein the selected first transmission time corresponds to a first amount of time delay that must elapse before transmission of the information occurs;

at the selected first transmission time, transmitting the information at the first transmit power level;

when the transmitted information was not successfully received by the network node, determining a size of a second contention window based on a size of the first contention window and on the first transmit power level;

selecting a second transmission time for the transmission of the information, wherein the selected second transmission time is determined by a number drawn from the second contention window and wherein the selected second transmission time corresponds to a second amount of time delay that must elapse before transmission of the information occurs; and at the selected second transmission time, transmitting the information at a second transmit power level, wherein the second transmit power level is randomly selected from among members of the plurality of fixed power levels that are greater than the first transmit power level.

2. The method of claim 1, comprising:

receiving power level information from the network node; and using the received power level information to determine the first transmit power level.

3. The method of claim 2, wherein using the received power level information to determine the first transmit power level comprises:

using the received power level information to determine a minimum transmit power level; and selecting the first transmit power level from one or more power levels that are at or above the minimum transmit power level.

4. The method of claim 3, wherein:

the one or more power levels that are at or above the minimum transmit power level comprise at least two transmit power levels, and selecting the first transmit power level from the one or more power levels that are at or above the minimum transmit power level comprises randomly selecting one of the at least two transmit power levels.

5. The method of claim 2, wherein the received power level information is a target receive power level, and wherein the method comprises:

using information about the random access channel to determine the first transmit power level such that it will cause transmitted information to be received at or above the target receive power level at the network node.

6. The method of claim 1, wherein a difference between any two of the plurality of fixed power levels is at least 5 dB.

7. The method of claim 6, wherein selecting the first transmit power level from the plurality of fixed power levels comprises selecting the first transmit power level from only the fixed power levels that satisfy a required link budget for transmission on the random access channel to the network node.

8. The method of claim 7, comprising:

determining the required link budget for the transmission on the random access channel to the network node by estimating a pathloss on the random access channel between the wireless communication device and the network node.

9. The method of claim 1, wherein selecting the first transmission time for the transmission of the information comprises randomly selecting a transmission time falling within the first contention window.

10. The method of claim 1, wherein the size of the second contention window is larger than the size of the first contention window.

11. The method of claim 1, wherein the wireless communication device performs all transmissions on the random access channel in compliance with IEEE 802.11 standards.

12. An apparatus for operating a wireless communication device to transmit information on a random access channel of a network node, the apparatus comprising:

circuitry configured to determine a first transmit power level for a transmission of the information by randomly selecting the first transmit power level from a plurality of fixed power levels;

circuitry configured to select a first transmission time for the transmission of the information, wherein the selected first transmission time is determined by a number drawn from a first contention window, and wherein the selected first transmission time corresponds to a first amount of time delay that must elapse before transmission of the information occurs;

circuitry configured to transmit the information at the first transmit power level at the selected first transmission time;

circuitry configured to determine, when the transmitted information was not successfully received by the network node, a size of a second contention window based on a size of the first contention window and on the first transmit power level;

circuitry configured to select a second transmission time for the transmission of the information, wherein the selected second transmission time is determined by a number drawn from the second contention window and wherein the selected second transmission time corresponds to a second amount of time delay that must elapse before transmission of the information occurs;

circuitry configured to transmit the information at a second transmit power level, at the selected second transmission time; and circuitry configured to randomly select the second transmit power level from among members of the plurality of fixed power levels that are greater than the first transmit power level.

13. The apparatus of claim 12, comprising:

circuitry configured to receive power level information from the network node; and circuitry configured to use the received power level information to determine the first transmit power level.

14. The apparatus of claim 13, wherein the circuitry configured to use the received power level information to determine the first transmit power level comprises:

circuitry configured to use the received power level information to determine a minimum transmit power level; and circuitry configured to select the first transmit power level from one or more power levels that are at or above the minimum transmit power level.

15. The apparatus of claim 14, wherein:

the one or more power levels that are at or above the minimum transmit power level comprise at least two transmit power levels, and the circuitry configured to select the first transmit power level from the one or more power levels that are at or above the minimum transmit power level comprises circuitry configured to randomly select one of the at least two transmit power levels.

16. The apparatus of claim 13, wherein the received power level information is a target receive power level, and wherein the apparatus comprises:

circuitry configured to use information about the random access channel to determine the first transmit power level such that it will cause transmitted information to be received at or above the target receive power level at the network node.

17. The apparatus of claim 12, wherein a difference between any two of the plurality of fixed power levels is at least 5 dB.

18. The apparatus of claim 17, wherein the circuitry configured to select the first transmit power level from the plurality of fixed power levels comprises circuitry configured to select the first transmit power level from only the fixed power levels that satisfy a required link budget for transmission on the random access channel to the network node.

19. The apparatus of claim 18, comprising:

circuitry configured to determine the required link budget for the transmission on the random access channel to the network node by estimating a pathloss on the random access channel between the wireless communication device and the network node.

20. The apparatus of claim 12, wherein the circuitry configured to select the first transmission time for the transmission of the information comprises circuitry configured to randomly select a transmission time falling within the first contention window.

21. The apparatus of claim 12, wherein the size of the second contention window is larger than the size of the first contention window.

22. The apparatus of claim 12, wherein the wireless communication device performs all transmissions on the random access channel in compliance with IEEE 802.11 standards.

\* \* \* \* \*